United States Patent
Devisch

(10) Patent No.: US 9,951,628 B2
(45) Date of Patent: Apr. 24, 2018

(54) WINDTURBINE AND BUILDING HAVING SUCH A WIND TURBINE

(71) Applicant: Geert Devisch, Knokke-heist (BE)

(72) Inventor: Geert Devisch, Knokke-heist (BE)

( * ) Notice: Subject to any disclaimer, the term of this patent is extended or adjusted under 35 U.S.C. 154(b) by 379 days.

(21) Appl. No.: 14/399,752

(22) PCT Filed: May 7, 2013

(86) PCT No.: PCT/IB2013/000859
§ 371 (c)(1),
(2) Date: Nov. 7, 2014

(87) PCT Pub. No.: WO2013/167947
PCT Pub. Date: Nov. 14, 2013

(65) Prior Publication Data
US 2015/0098828 A1    Apr. 9, 2015

(30) Foreign Application Priority Data

May 8, 2012   (BE) .................................. 2012/0306

(51) Int. Cl.
*F01D 5/14* (2006.01)
*F03D 3/04* (2006.01)

(52) U.S. Cl.
CPC ........... *F01D 5/141* (2013.01); *F03D 3/0409* (2013.01); *F05B 2250/15* (2013.01); *Y02B 10/30* (2013.01); *Y02E 10/74* (2013.01)

(58) Field of Classification Search
CPC .. F03D 3/0409; F03D 3/0427; F05B 2250/15; Y02B 10/30
See application file for complete search history.

(56) References Cited

U.S. PATENT DOCUMENTS 5,852,331 A    12/1998   Giorgini
6,465,899 B2 *  10/2002   Roberts ................. F03D 3/0409
                                                          290/44

(Continued)

FOREIGN PATENT DOCUMENTS

CN    201972884 U    9/2011
FR      2886353 A1  12/2006
WO   2006095369 A1   9/2006

OTHER PUBLICATIONS

Sbtroy, Build a 15,000 rpm Tesla Turbine using hard drive platters, May 25, 2006, Instructables.*

(Continued)

*Primary Examiner* — Richard Edgar
*Assistant Examiner* — John S Hunter
(74) *Attorney, Agent, or Firm* — Symbus Law Group, LLC; Clifford D. Hyra

(57) ABSTRACT

Wind turbine (1) comprising a rotor (2) around a rotation shaft (3), having a plurality of blades (4) at a distance around the rotation shaft (3), in which the blades (4) can drive the rotor (2); a cavity (10) which extends between the ends (15) of the blades (4) closest to the rotation shaft (3); a plurality of vanes (5) around the rotor (2) for guiding wind to the blades (4), in which the vanes (5) extend from the ends (14) of the blades (4) furthest from the rotation shaft (3) to a second end (16) of the vanes (5). The vanes (5) and blades (4) merge into each other at the same curvature mathematically tangentially in a plane at right angles to the rotation shaft (3) and the curvature of the vanes (5) is described by a part of a logarithmic spiral.

15 Claims, 3 Drawing Sheets

(56) References Cited

U.S. PATENT DOCUMENTS

| | | | |
|---|---|---|---|
| 2002/0109358 A1 | 8/2002 | Roberts | |
| 2009/0167029 A1* | 7/2009 | Klimov | F03D 3/02 290/55 |
| 2009/0304512 A1* | 12/2009 | Attey | F03D 3/002 416/197 A |
| 2011/0206526 A1* | 8/2011 | Roberts | F03D 3/02 416/223 R |
| 2012/0032447 A1* | 2/2012 | Bang-Moeller | F03D 1/04 290/54 |

OTHER PUBLICATIONS

Tool Using Animal, Parasitic Wind Turbine, Jan. 8, 2011, Instructables, intro and step 1.*
International Search Report dated Jun. 27, 2013.

\* cited by examiner

WINDTURBINE AND BUILDING HAVING SUCH A WIND TURBINE

This application claims the benefit of Belgian patent applications No. BE-2012/0306, filed May 8, 2012, which is hereby incorporated by reference in its entirety.

FIELD OF THE INVENTION

The present invention relates to a wind turbine according to the preamble of the first claim.

BACKGROUND

Such a wind turbine is also described in US 2002/109358 A1. US 2002/109358 A1 describes a wind turbine with a rotor and a plurality of vanes. The rotor is rotatably arranged around the rotation shaft of the wind turbine according to a rotating movement around the rotation shaft. A plurality of blades is point-symmetrically fitted around the rotation shaft. The blades are arranged such that they can drive the rotor according to the rotating movement around the rotation shaft under the effect of the wind. The blades extend from one end to only a distance from the rotation shaft and thus delimit a cavity which comprises the rotation shaft. The wind turbine also comprises a plurality of vanes. The vanes are arranged point-symmetrically around the hollow rotor in order to guide wind to the blades of the rotor. The wind which is guided to the rotor by the vanes drives the hollow rotor according to the rotating movement. The vanes extend virtually from the ends of the blades to an end of the vanes.

Another such wind turbine is described in WO 2006/095369 A1.

However, it has been found that such wind turbines are not sufficiently efficient.

It is therefore also an object of the present invention to provide such a wind turbine with increased efficiency.

This is achieved by a wind turbine of the present invention.

To this end, when the vanes and the blades are in line with one another, they merge into each other at their adjacent ends at virtually the same curvature virtually mathematically tangentially in a plane virtually at right angles to the rotation shaft. In addition, the curvature of the blades, at the location of their first ends, extends radially to the rotation shaft in this plane and the curvature of the vanes in this plane is described by a part of a virtually logarithmic spiral, also known as a "spira mirabilis".

A logarithmic spiral is a spiral which substantially satisfies the formula in polar coordinates $r = a \exp(b\,\theta)$ in which r is the radius measured from the origin, $\theta$ is the angle measured from a half-line with boundary point in the origin and a and b are random positive real values. The value b is also referred to as the growth factor.

Since the vanes and the blades, when they are in line with each other, merge into each other at the ends of the blades at virtually the same curvature virtually mathematically tangentially in a plane virtually at right angles to the rotation shaft, it has been found that a more continuous and permanent laminar wind flow can be achieved in the direction towards the blades of the rotor. In such a flow, no wind energy is lost due to, for example, turbulences caused by, for example, a transition between the vanes and the blades at the ends of the blades which is entirely not mathematically tangential and/or does not have the same curvature at all.

In the context of the present invention, mathematically tangential means that the first derivative of the curve of the blades and the vanes is constant at the transition between the blades and the vanes in the virtually horizontal plane.

In addition, it has been found that, due to the curvature of the vanes in the plane virtually at right angles to the rotation shaft described by a virtually logarithmic spiral, a further improvement of the laminarity of the wind flow towards the rotor can be achieved.

Although the velocity of the wind which drives the rotor can be increased by guiding the wind over the vanes, in which case the vanes are curved in such a manner that the vanes compress a volume of wind at a certain velocity to a smaller volume of wind at a greater velocity, it has been found that such an increase of the wind velocity is associated with a loss of laminarity of the wind, again resulting in a loss of energy to turbulence and often the required rotary velocity of the rotor can again not be reached.

However, by using the vanes and the blades according to the present invention, the inventor has found that the vanes make it possible to increase the velocity of the wind present around the wind turbine without significantly disturbing the laminarity of the wind, so that it becomes possible still to increase the rotary velocity of the rotor at the naturally occurring wind velocities. If necessary, the vanes may rotate around the rotation shaft of the rotor with respect to the rotor depending on the direction of the wind in order to make better use of the wind velocities present.

It has been found that, by using the wind turbine according to the present invention, a relatively small rotating rotor can still produce a relatively large amount of rotary energy.

Due to the cavity in the rotor which extends between the first ends of the blades, it has been found that, above a certain wind velocity, the rotary velocity rotor suddenly increases at an otherwise steady increase in wind velocity. Without wishing to be bound by any theory, it is assumed that from a certain critical, rotary-dependent rotary velocity of the hollow rotor, which is caused by the wind which is supplied, such an underpressure is created in the cavity of the hollow rotor that the rotary velocity of the hollow rotor increases to a greater degree at an increased wind velocity than before the critical rotary velocity is reached. Although the effect of the critical rotary velocity for the efficiency of a hollow rotor is already known from pumps in which the hollow rotor is driven in a rotating movement in order to be able to suck up a volume of fluid, this critical rotary velocity has not yet been described for wind turbines.

However, it has been found that, under common wind conditions on earth, this critical rotary velocity can only be achieved with difficulty, if at all, by wind turbines with a hollow rotor without increasing the natural wind velocity present by means of vanes having a curvature according to the present invention, thus limiting the efficiency of wind turbines.

SUMMARY

By making use of the vanes and the blades according to the present invention, the vanes make it possible to increase the velocity of the wind which is present around the wind turbine to just above the critical rotary velocity.

According to preferred embodiments of the present invention, the rotation shaft is a vertical shaft. It has been found that, by using a vertical shaft and a point-symmetrical arrangement of the blades, the speed of rotation of the rotor around the vertical shaft is less dependent on the wind direction, due to the fact that such a wind turbine with a vertical shaft is less dependent on the wind direction of the wind which is present around the wind turbine. However, in the context of the present invention, it is also possible for the rotation shaft to assume a different direction and, for example, to be a horizontal shaft, in which case the rotation shaft of the rotor is arranged parallel to the ground in an optimum manner.

According to preferred embodiments of the present invention, the virtually logarithmic spiral is a virtually golden spiral. A golden spiral is a spiral whose growth factor b is chosen such that it equals the golden ratio φ, the golden ratio being equal to (½) (1+√5) which approximately equals 1.6180339887, if θ is equal to a right angle. If θ is expressed in radials, this becomes (ln φ)/(π/2), which approximately equals 0.306349. It has been found that such a spiral significantly reduces the risk of, for example, the occurrence of turbulences and of disturbing the laminarity of the wind, as a result of which the efficiency of the wind turbine can be increased further.

According to preferred embodiments of the present invention, the virtually logarithmic spiral is approximated by the fact that the curvature radius of the vanes increases at each quarter turn, starting at the second end of the blades, in a stepped manner by a factor α, with α being calculated as 1.618±3% and with the curvature radius over the first quarter turn being equal to the factor α multiplied by the curvature radius of the blades. Preferably, the curvature radius of the blades is the mean curvature radius determined along the length of the blades from the rotation shaft to the end of the blades. Although such a shape of the vanes is only an approximation of the golden spiral, it has been found that it is still possible to maintain a sufficient laminar wind flow, while the calculation of the shape of the vanes is facilitated significantly as it is possible to start from the curvature radius of the blades which can usually be determined relatively easily. An approximation of the golden spiral which is constructed in this way is also known as a Fibonnaci spiral.

Preferably, not only the blades, but also the vanes of a wind turbine according to the present invention are arranged point-symmetrically around the rotor in order to increase efficiency further.

The curvature of the blades of a wind turbine according to the present invention is preferably crescent-shaped in a plane virtually at right angles to the rotation shaft.

According to preferred embodiments of the present invention, the ratio of the distance between the second ends of two consecutive vanes and the distance between the second ends of two consecutive blades of the rotor is given by a factor A which can assume values from 2.6, preferably 5.2 or greater. It has been found, that with such a ratio it is possible to maintain the laminarity of the wind flow further and that the risk of the occurrence of, for example, turbulences can be reduced further.

According to preferred embodiments of the present invention, there are essentially twice as many vanes as blades. The inventor has found that such an embodiment results in a further increase in efficiency of the conversion of the wind energy into rotary energy of the rotor.

According to further embodiments of the present invention, the height of the rotor is substantially equal to the golden ratio multiplied by the diameter of the rotor. It has been found that a deviation of at most 3% from this ratio is preferred in this case.

It has been found that the efficiency of a wind turbine according to the present invention can be increased still further by making the cavity cylindrical with a diameter, the diameter of the rotor being 2.875 multiplied by the diameter of the cavity or deviates therefrom by at most 3%.

According to preferred embodiments of the present invention, the wind turbine comprises limiting elements which at least partly delimit the air flow ducts between the blades and/or between the vanes, at right angles to the rotation shaft.

It has been found that the efficiency of a wind turbine according to the present invention can be increased still further if at least a part of these limiting elements in a plane through the rotation shaft has described a curvature through a part of a virtually logarithmic spiral. In this case, this virtually logarithmic spiral is advantageously a golden spiral.

According to preferred embodiments of the present invention, the wind turbine comprises means for converting the rotating movement of the rotor into electrical energy. It has been found that such means make it possible to generate electrical energy using the wind turbine according to the present invention.

The invention also relates to a building comprising a roof which at least partly covers the building, in which said roof comprises a roof edge and in which the building comprises a wind turbine according to the present invention on the roof of the building, in which the rotation shaft of the wind turbine is arranged virtually parallel to the roof edge. It has been found that the building then forms an additional wind catch for the wind turbine. It has been found that, in particular if the building is located in areas with a relatively high wind velocity, such as a coast, such as for example the Belgian coast, it is still possible to generate sufficient energy in a relatively silent manner.

BRIEF DESCRIPTION OF THE DRAWINGS

The invention will be explained further with reference to the attached drawings, in which.

In the drawings, identical or similar parts are denoted by the same reference numerals.

DETAILED DESCRIPTION OF EMBODIMENTS

Figure 1:
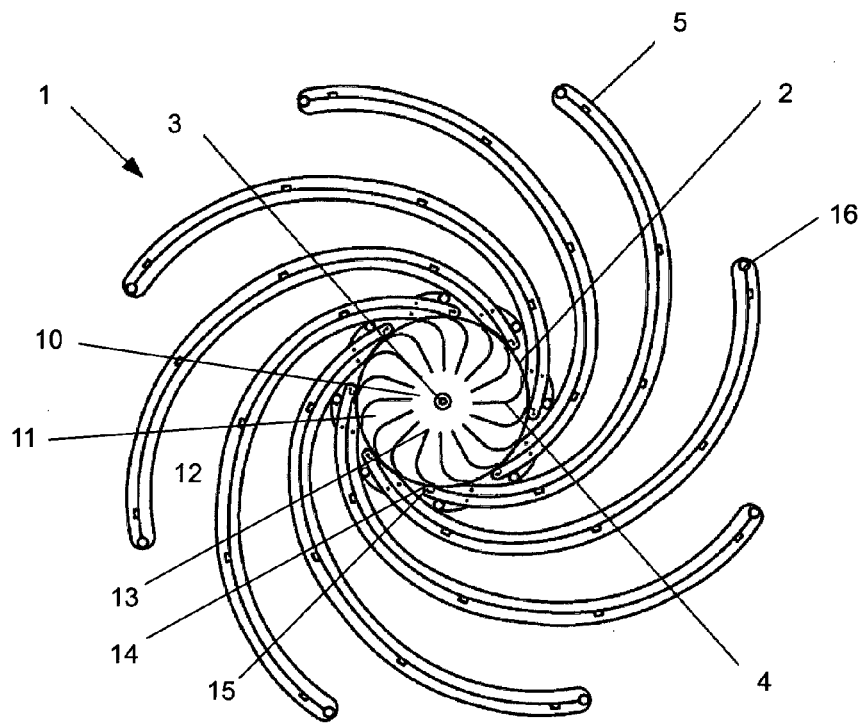
FIG. 1 shows a top view of a preferred embodiment of the wind turbine according to the invention.

In the following description, numerous specific details are described in order to offer a thorough understanding of the invention and of the way in which it can be used in specific embodiments. However, it is clear that the present invention can be used without these specific details. In other cases, well-known methods, procedures and techniques are not described in detail in order not to render the invention unclear. Although the invention will be described with reference to particular embodiments and specific figures, the invention is not limited thereto. The figures which have been incorporated and described herein are diagrammatic and do not limit the scope of protection of the invention.

FIGS. 1, 2, 6 and 7 illustrate a wind turbine (1) according to the invention with a rotor (2), rotatably arranged around the shaft (3) of the wind turbine (1). The wind turbine (1) is preferably arranged in a location where there are strong winds, such as for example on the roof (17) of a building having a rood edge (18), for example a cooling tower, as illustrated in FIG. 3, on the top of a pillar or an aerial mast and other locations where the force of the wind is not reduced by surrounding structures and the presence of the wind turbine 1 is not regarded as aesthetically unpleasant.

The rotor (2) which is rotatably arranged around the rotation shaft (3) of the wind turbine (1) according to a rotating movement around the rotation shaft (3) comprises a plurality of blades (4) which are fitted point-symmetrically around the rotation shaft (3). Air flow ducts (11) extend between the blades (4).

The rotor (2) which is illustrated in the figures is a hollow rotor (2). The hollow rotor (2) may, for example, be placed on the ground, in which case said ground may serve as a limiting element, or may be installed on a baseplate (9), the shape of the base surface of which is substantially similar to the rotor (2). The rotation shaft (3) has a first end and a second end, with the second end being fitted rotatably on the baseplate, if present.

In the context of the present invention, the rotation shaft (3) may be either a physical rotation shaft or a virtual rotation axis. Materials which are suitable for producing the real rotation shaft (3) are, for example, materials which can withstand weather conditions and are sufficiently strong to withstand the constant action of the wind which may vary greatly in strength, for example steel or steel alloys, such as stainless steel. FIGS. 1, 2, 6 and 7 show a wind turbine (1) with a vertical rotation shaft (3) and FIG. 3 shows a plurality of wind turbines (1) in which the rotation shaft (3) is arranged horizontally.

The blades (4) extend from a first end (13) of the blades (4) which is situated furthest from the rotation shaft (3) up to a second end (14) which is situated only a distance from the rotation shaft (3) and thus delimit a cavity (10), in which the cavity (10) comprises the rotation shaft (3). Viewed in a plane at right angles to the rotation shaft (3), the blades (4) are of crescent-shaped design and, at their first end (13), end in a part which extends radially to the rotation shaft (3). The air flow ducts (11) between the blades (4) furthermore end freely in the cavity (10).

The dimensions of the rotor (2) are determined by the diameter and the height of the rotor (2). In a preferred embodiment, the height of the hollow rotor (2) is substantially equal to the golden ratio multiplied by the diameter of the rotor (2).

Figure 2:
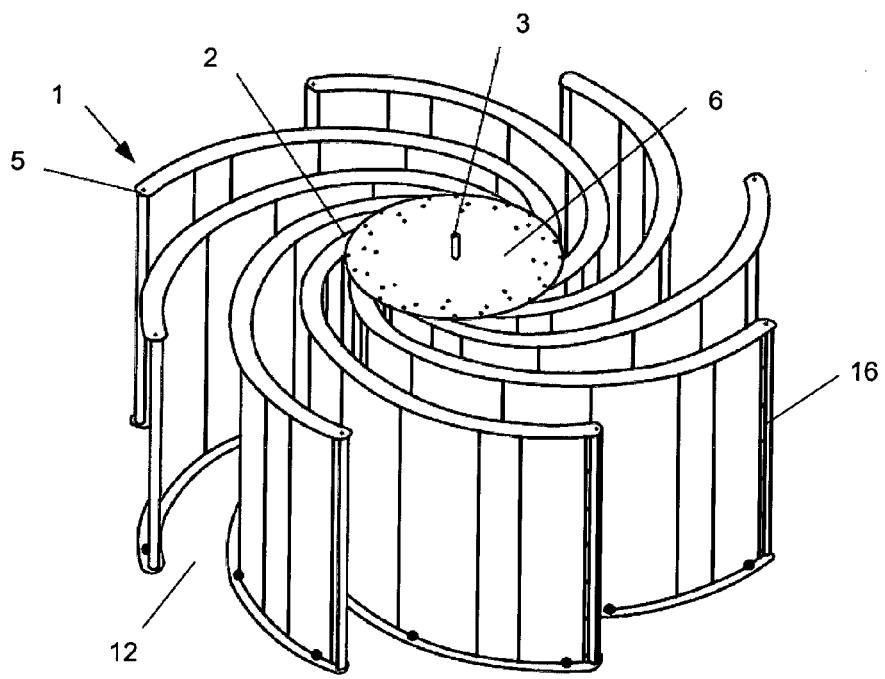
FIG. 2 shows a perspective view of a preferred embodiment of the wind turbine according to the invention.
Figure 3:
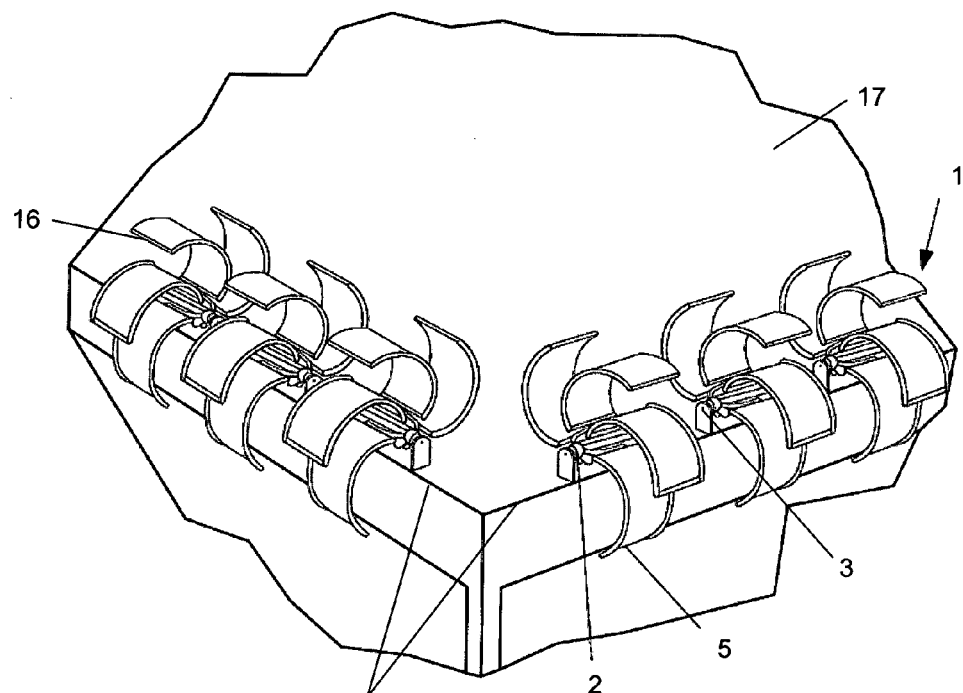
FIG. 3 shows a perspective view of a plurality of wind turbines according to the invention which are fitted on a roof.

As can be seen in FIG. 2, the hollow rotor (2) may preferably be covered by a cover plate (6) in which a perforation is provided for the rotation shaft (3). Such a cover plate (6) delimits the air flow ducts (11) between the blades (4) in order to optimize the flow of air and protects the hollow rotor (2) by preventing, for example, objects from ending up in the rotor (2) from above and thus from impeding the operation of the wind turbine. It is particularly advantageous if a baseplate (9) and a cover plate (6) are present which are of virtually identical shape and are fitted symmetrically around the rotation shaft (3). The baseplate (9) and the cover plate (6) may be made of metal, for example steel, aluminium or a metal alloy, or a plastic, such as polyvinyl chloride (PVC), polyethene (PE), polypropene (PP), polystyrene (PS), polyurethane (PUR), polyester or polyethylene terephthalate (PET). The blades (4) are arranged in such a manner that they can drive the rotor (2) according to the rotating movement around the rotation shaft (3) under the effect of the wind. Preferably, the blades (4) are made of a lightweight material, such as for example a plastic, such as polyvinyl chloride (PVC), polyethene (PE), polypropene (PP), polystyrene (PS), polyurethane (PUR), polyester or polyethylene terephthalate (PET), or a lightweight metal, such as aluminium, but a canvas made from a suitable type of textile is also a possibility. In order to reduce friction and thus facilitate the rotating movement, (ball) bearings may, for example, be provided which may be fitted symmetrically to or near the ends of the rotation shaft (3).

A plurality of vanes (5) are arranged around the hollow rotor (2). FIG. 2 shows a plurality of vanes (5) with a bottom edge and a top edge which define a curved outer surface and an inner surface for each vane (5). The vanes (5) may be made in one piece or may be composed of several pieces. Suitable materials for producing the vanes (5) are, for example, metals, such as steel, aluminium or a metal alloy, or a plastic such as polyvinyl chloride (PVC), polyethene (PE), polypropene (PP), polystyrene (PS), polyurethane (PUR), polyester or polyethylene terephthalate (PET), depending on the environment in which the wind turbine (1) is to be placed. Air flow ducts (12) extend between the vanes (5) and are provided in order to guide wind towards the blades (4) of the hollow rotor (2) and thus to drive the hollow rotor (2) according to the rotating movement, with the vanes (5) extending from a first end (15) virtually at the location of the second ends (14) of the blades (4) to a second end (16) of the vanes (5) which is arranged further from the rotation shaft (3) than their first end (15). In certain preferred embodiments, twice as many vanes (5) are provided as blades (4). The figures also show that the vanes (5) are much larger than the blades (4), as a result of which the rotating part of the wind turbine (1) remains relatively small compared to the overall size of the turbine (1), thus limiting wear and noise pollution resulting from rotation of the rotor (2).

FIG. 1 shows that when the vanes (5) and the blades (4) are in line with one another, they merge into each other at the ends of the blades (4) at virtually the same curvature virtually mathematically tangentially in a plane at right angles to the rotation shaft (3), as a result of which a more continuous and steady laminar wind flow towards the blades (4) of the hollow rotor (2) can be achieved. The curvature of the vanes (5) in the horizontal plane is defined by a part of a virtually logarithmic spiral. This shape significantly reduces the risk of, for example, turbulences occurring or of the laminarity of the wind being disturbed, as a result of which the efficiency of the wind turbine can be increased further.

Figure 6:
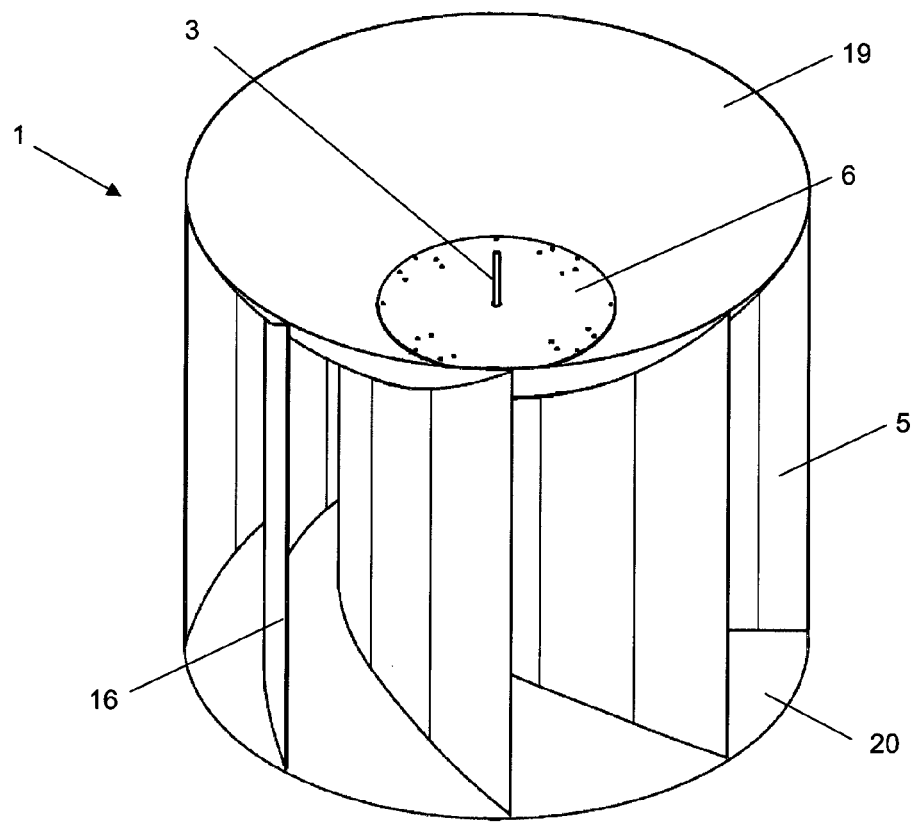
FIG. 6 shows a perspective view of a further preferred embodiment of the wind turbine according to the invention.
Figure 7:
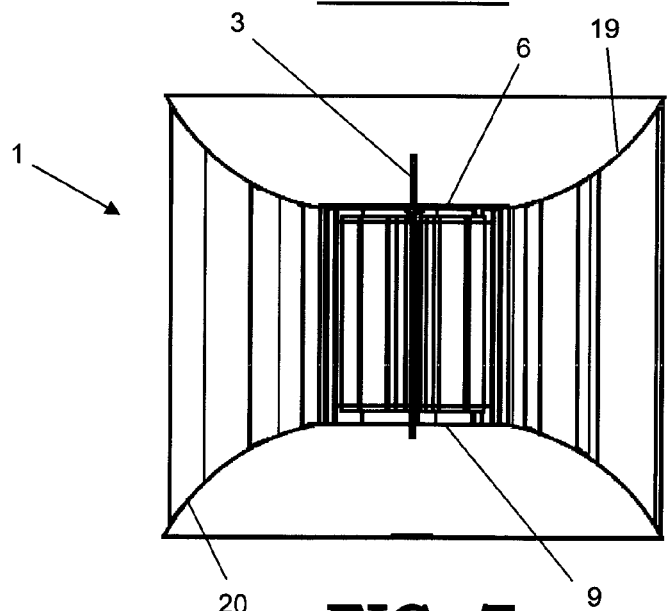
FIG. 7 shows a cross section of a preferred embodiment of the wind turbine according to the invention, cut through the rotation shaft.

As can be seen in FIGS. 6 and 7, the vanes (5) and the air flow ducts (12) extending between them may also preferably be covered by end plates (19, 20). In this case, the curvature of these end plates (19, 20) is defined by a part of a golden spiral, viewed in a plane through the rotation shaft (3).

The wind turbine (1) preferably also comprises means for converting the rotating movement of the rotor (2) into electrical energy, such as for example an alternator. An alternator (or alternating current generator) is a machine in which mechanical energy, entering via a rotating shaft, in this case the rotor (2) of the wind turbine (1), is converted into electrical energy (alternating current). This conversion is based on the fact that when an electrical conductor moves through a magnetic field, electrical voltages are generated in said conductor and current starts to flow if the circuit is closed. In principle, an alternator contains the following two parts: the stator, the stationary part, and the rotor, the rotating part. In the alternator, the magnetic field may be generated by one or more permanent magnets. The stator contains one or more coils in which the desired sinusoidal alternating current voltage is generated by rotating the rotor. In the context of the present invention, it is, for example, possible to use an axial flux alternator. This is a type of alternator in which the magnets are fitted on discs and the flux between the magnets runs parallel to the rotation shaft of the wind turbine (1) and this type of alternator is ideal for generating electricity, even when the speed of rotation of the rotor (2) is low.

Figure 4:
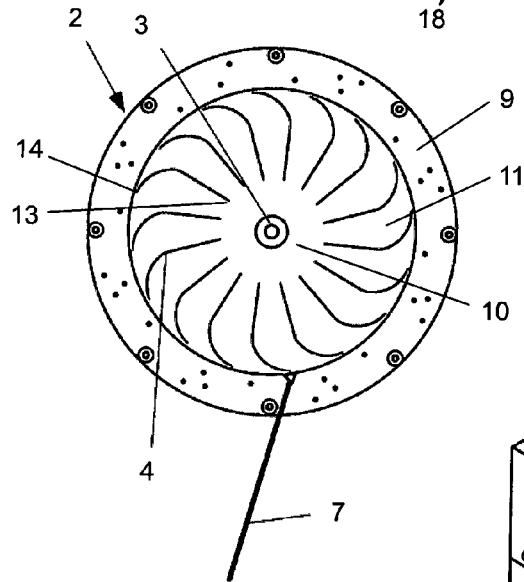
FIG. 4 shows a top view of a rotor to which a compressed air hose is connected.

In certain applications, the wind turbine (1) may also be driven by wind which is, for example, supplied by a compressed air hose (7) to the rotor (2), as is shown in FIG. 4. The compressed air which is supplied to the rotor (2) via the compressed air hose (7) is intended to contribute to reaching a critical rotary velocity, above which the efficiency of the wind turbine (1) increases significantly. The compressed air may, for example, also be replaced by pressurized water or steam or still other fluids.

Figure 5:
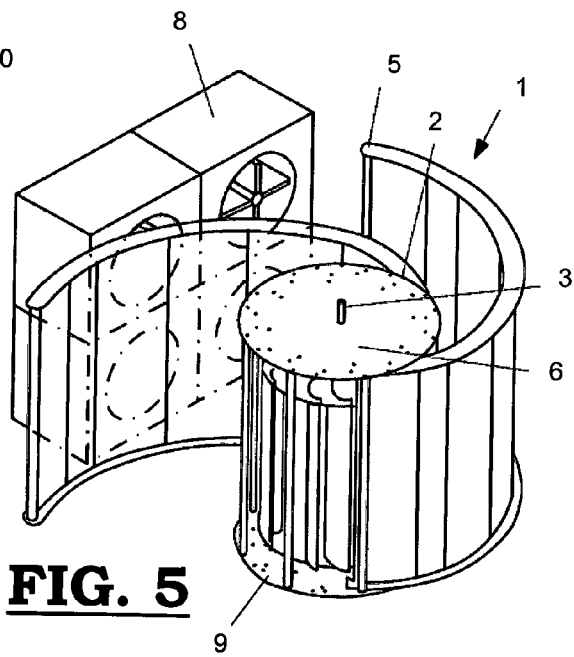
FIG. 5 shows a perspective view of a wind turbine according to the invention which is fitted in the vicinity of a condenser.

Another possibility in this context is, for example, to drive the wind turbine (1) using the air displacement of a condenser (8) of an air-conditioning system which may be situated on a roof, as is illustrated in FIG. 5. The air displacement which is caused by a condenser (8) of an air-conditioning system may be caught by the vanes (5) which are arranged around the rotor (2) and which thus drive the rotor (2). Therefore, due to the wind turbine according to the invention, the air flow of the condenser (8) can be converted into clean energy. Yet another possibility involves the use of the air displacement caused by a ventilation system by fitting the wind turbine (1) above the ventilation duct and to guide the air displacement towards the rotor (2) of the wind turbine (1).

The invention claimed is:

1. Wind turbine comprising:
a rotor, rotatably arranged around a rotation shaft of the wind turbine according to a rotating movement around the rotation shaft, having a plurality of blades which are fitted point-symmetrically around the rotation shaft, in which the blades delimit air flow ducts and are arranged such that they can drive the rotor according to the rotating movement around the rotation shaft under an effect of the wind, and in which each of the blades extends between a first blade end and a second blade end, in which the first blade ends are arranged only a distance from the rotation shaft and the second blade ends are arranged further away from the rotation shaft than said first blade ends;
a cavity which extends between the first blade ends of the blades, in which the air flow ducts between the blades' ends; and
a plurality of vanes, arranged around the rotor which delimit air flow ducts in order to guide wind to the blades of the rotor and thereby to drive the rotor according to the rotating movement, in which each of the vanes extends between a first vane end and a second vane end, in which the first vane ends are arranged approximately at the location of the second blade ends of the blades and the second vane ends are arranged further away from the rotation shaft than the first vane ends;
wherein, when the vanes and the blades are in line with one another, they merge into each other at the second blade ends of the blades and the first vane ends of the vanes at approximately the same curvature approximately mathematically tangentially in a plane approximately at right angles to the rotation shaft, and wherein there are approximately twice as many blades as vanes;
wherein the curvature of the blades, at the location of their first blade ends, extends radially to the rotation shaft in this plane, and wherein the curvature of the vanes in this plane, is described by a part of an approximately logarithmic spiral;
wherein the ratio of the distance between the second vane ends of two consecutive vanes and the distance between the second blade ends of two consecutive blades of the rotor is given by a factor A which can assume values from 2.6 on; and
wherein the cavity is cylindrical with a diameter, the diameter of the rotor being approximately 2.875 multiplied by the diameter of the cavity.

2. Wind turbine according to claim 1, characterized in that the rotation shaft is a vertical shaft.

3. Wind turbine according to claim 1, characterized in that the approximately logarithmic spiral is an approximately golden spiral with a growth factor of approximately the golden ratio.

4. Wind turbine according to claim 3, characterized in that the approximately logarithmic spiral is approximated by the fact that the curvature radius of the vanes increases at each quarter turn, starting at the second blade ends of the blades, in a stepped manner by a factor a, with a being calculated as 1.618±3% and with the curvature radius over the first quarter turn being equal to the factor a multiplied by the curvature radius of the blades.

5. Wind turbine according to claim 1, characterized in that the vanes are arranged point-symmetrically around the rotor.

6. Wind turbine according to claim 1, characterized in that the curvature of the blades is substantially crescent-shaped in a plane approximately at right angles to the rotation shaft.

7. Wind turbine according to claim 1, characterized in that the factor A can assume values from 5.2 or greater.

8. Wind turbine according to claim 1, characterized in that the height of the rotor is substantially equal to the golden ratio multiplied by the diameter of the rotor.

9. Wind turbine according to claim 1, characterized in that the wind turbine comprises air flow duct delimiters between the blades, approximately at right angles to the rotation shaft.

10. Wind turbine according to claim 9, characterized in that the wind turbine comprises air flow duct delimiters between the vanes, approximately at right angles to the rotation shaft.

11. Wind turbine according to claim 1, characterized in that at least a part of the air flow duct delimiters in a plane through the rotation shaft has described a curvature through a part of an approximately logarithmic spiral.

12. Wind turbine according to claim 1, characterized in that an air displacement of a condenser is directed towards the wind turbine.

13. Wind turbine according to claim 1, characterized in that a supply hose is connected to the rotor in order to supply fluids to the rotor.

14. Building comprising a roof which at least partly covers the building, in which said roof comprises a roof edge, characterized in that the building comprises a wind turbine according to claim 1 on the roof of the building, in which the rotation shaft of the wind turbine is arranged substantially parallel to the roof edge.

15. Building according to claim 14, characterized in that the rotation shaft of the wind turbine is a horizontal shaft.

\* \* \* \* \*